(12) United States Patent
Popova

(10) Patent No.: US 10,905,271 B1
(45) Date of Patent: Feb. 2, 2021

(54) METHOD OF FORMING AN ANTI-FATIGUE MAT

(71) Applicant: Mon Chateau LLC, Boca Raton, FL (US)

(72) Inventor: Olesya Popova, Pompano Beach, FL (US)

(73) Assignee: Mon Chateau, LLC, Boca Raton, FL (US)

( * ) Notice: Subject to any disclaimer, the term of this patent is extended or adjusted under 35 U.S.C. 154(b) by 0 days.

(21) Appl. No.: 16/860,413

(22) Filed: Apr. 28, 2020

(51) Int. Cl.
```
B29C 43/18      (2006.01)
A47G 27/02      (2006.01)
B32B 9/02       (2006.01)
B32B 9/04       (2006.01)
B32B 27/40      (2006.01)
B32B 27/18      (2006.01)
B32B 27/08      (2006.01)
B29C 43/00      (2006.01)
B29L 31/00      (2006.01)
B29K 105/00     (2006.01)
B29K 75/00      (2006.01)
B29K 711/08     (2006.01)
```

(52) U.S. Cl.
CPC ........ *A47G 27/0231* (2013.01); *B29C 43/003* (2013.01); *B29C 43/18* (2013.01); *B32B 9/025* (2013.01); *B32B 9/045* (2013.01); *B32B 27/08* (2013.01); *B32B 27/18* (2013.01); *B32B 27/40* (2013.01); *B29C 2043/189* (2013.01); *B29K 2075/00* (2013.01); *B29K 2105/0061* (2013.01); *B29K 2711/08* (2013.01); *B29L 2031/7324* (2013.01); *B32B 2250/03* (2013.01); *B32B 2471/04* (2013.01)

(58) Field of Classification Search
None
See application file for complete search history.

(56) References Cited

U.S. PATENT DOCUMENTS

| | | | | |
|---|---|---|---|---|
| 3,308,491 A | * | 3/1967 | Spence ................ | A47C 27/148 5/676 |
| 4,913,755 A | * | 4/1990 | Grim .................... | A61F 5/0111 156/145 |

(Continued)

*Primary Examiner* — Edmund H Lee
(74) *Attorney, Agent, or Firm* — The Concept Law Group, PA; Scott D. Smiley; Scott M. Garrett

(57) ABSTRACT

An anti-fatigue mat is made by placing a top surface layer member upside down on a mold surface having a contiguous raised portion that defines the perimeter of the anti-fatigue mat. The raised portion surrounds a region into which a major portion of the surface layer sits, resulting in a depression formed relative to the height of the raised portion in the area surrounded by the raised portion. A frame member fit around the raised portion and holds the top surface layer member in place. A gel material is dispensed onto the back side, which is facing upward in the mold, of the top surface layer member. A substrate material is then dispensed onto the gel material and a press head is lowered onto the mold to apply pressure and heat. After the press head is removed, the rough mat can be removed and trimmed to form an anti-fatigue mat. The composition of the gel and substrate materials are carefully selected to achieve the desired bonding of the layers as well as the desired resilience and compressibility of the mat to provide the anti-fatigue effect.

20 Claims, 15 Drawing Sheets

(56) References Cited

U.S. PATENT DOCUMENTS

| | | | | |
|---|---|---|---|---|
| 7,682,680 | B2* | 3/2010 | McMahan | B29C 65/00 |
| | | | | 428/76 |
| 7,754,127 | B2* | 7/2010 | McMahan | B29C 65/48 |
| | | | | 264/261 |
| 9,962,902 | B2* | 5/2018 | Losio | B29C 41/50 |
| 10,582,793 | B1* | 3/2020 | McMahan | A47G 27/0231 |
| 2004/0209062 | A1* | 10/2004 | Sebag | B29C 44/086 |
| | | | | 428/304.4 |
| 2006/0031994 | A1* | 2/2006 | Willat | B25G 1/102 |
| | | | | 5/655.5 |
| 2008/0034614 | A1* | 2/2008 | Fox | A43B 17/026 |
| | | | | 36/43 |
| 2008/0078028 | A1* | 4/2008 | McMahan | B29C 66/131 |
| | | | | 5/420 |
| 2008/0113170 | A1* | 5/2008 | McMahan | B32B 38/1833 |
| | | | | 428/217 |
| 2009/0255625 | A1* | 10/2009 | Fox | B29D 35/148 |
| | | | | 156/247 |
| 2014/0302271 | A1* | 10/2014 | Losio | B32B 7/02 |
| | | | | 428/76 |

* cited by examiner

METHOD OF FORMING AN ANTI-FATIGUE MAT

FIELD OF THE INVENTION

The present invention relates generally to anti-fatigue mats, and, more particularly, relates to an anti-fatigue mat made using a simplified process for increased manufacturing output.

BACKGROUND OF THE INVENTION

Anti-fatigue floor mats are used in places where it is necessary to stand for extended periods of time, such as in a kitchen, at a retail checkout counter, and other similar places. Anti-fatigue mats include compliant materials that provide some cushion relative to a hard floor, and are believed to relieve blood circulation pressure in the feet of the person standing on the floor mat, and also reduce the strain on the waist, legs, knees, etc. Conventional anti-fatigue mats have been made of high density foam material, such as polyurethane. However it has been found that foam does not wear well with age, and can deteriorate to the point of being ineffective over time.

To improve the long term efficacy of anti-fatigue mats, gel materials have been used in a layer within a mat. The gel material is a solid, non-flowing, homogenous compliant material that is more durable than compliant foam material. In manufacturing mats using gel materials, however, care must be taken in sealing the edges of the mat, otherwise the material layer can separate and pull apart from each other.

Therefore, a need exists to overcome the problems with the prior art as discussed above.

SUMMARY OF THE INVENTION

In accordance with some embodiments of the inventive disclosure, there is provided a method of forming an anti-fatigue mat that includes providing a lower mold that includes a mold surface with a raised portion on the mold surface that is configured to define a perimeter of the anti-fatigue floor mat. The raised portion forms a cavity within an area surrounded by the raised portion. The mold further includes an outer frame member having an opening therethrough that is sized to fit around the raised portion of the mold surface. The method further includes providing an upper mold that includes a press head having a surface that is sized and shaped to cover the raised portion and the outer frame member. The method further includes placing a top surface layer member of the anti-fatigue mat over the raised portion, with an external side of the top surface layer member facing down, and pressing the top surface layer member into the cavity. The method further includes placing the outer frame member over the raised portion and the top surface layer member such that the top surface layer member is between the outer frame member and the mold surface. The method further includes dispensing a gel material on the top surface layer member in the cavity sufficient to cover a portion of the top surface layer member in the cavity completely to a thickness of two millimeters to two centimeters. The method further includes dispensing a substrate material onto the gel material, wherein an amount of the substrate material is sufficient to cover the gel material completely within the cavity. The method further includes closing the press head onto the lower mold, while the press head is heated, to cure the gel material and the substrate material and thereby create a cured mat assembly, and opening the press head and the outer frame member, and removing the cured mat assembly from the mold surface and trimming excess material of the cured mat assembly to produce the anti-fatigue mat.

In accordance with another feature, dispensing the gel material comprises dispensing the gel material having a viscosity of 7000 to 11000 centipoise when cured.

In accordance with another feature, dispensing the gel material comprises dispensing the gel material that is a mixture having 200-300 parts by weight of isocyanate, and 1000 parts by weight of polyurethane.

In accordance with another feature, dispensing the gel material comprises dispensing the gel material that is a mixture having 240 parts by weight of isocyanate, and 1000 parts by weight of polyurethane.

In accordance with another feature, dispensing the substrate material comprises dispensing the substrate material as a mixture of 32 to 60 parts by weight of isocyanate to 100 parts by weight of polyurethane.

In accordance with another feature, dispensing the substrate material comprises dispensing the substrate material as a mixture of 40 parts by weight of isocyanate to 100 parts by weight of polyurethane.

In accordance with another feature, closing the press head onto the lower mold comprises applying a pressure of about 0.7 mPa and a temperature of 45 degrees Celsius.

In accordance with another feature, closing the press head comprises closing the press head for a period of at least 5 minutes before opening the press head.

In accordance with some embodiments of the inventive disclosure, there is provided a method for producing a mat that includes preparing a top surface layer member having a top side and bottom side, the bottom side facing upward in a lower mold. The method further includes forming a gel layer on the bottom side of the top surface layer member, the gel layer having a viscosity of 1100-7000 cps, wherein the gel layer bonds to the bottom side of the top surface layer member. The method further includes forming a substrate layer on the gel layer, wherein the substrate layer bonds to the gel layer.

In accordance with another feature, the top surface layer member is a fabric.

In accordance with another feature, the fabric is one of leather, cotton, or polyester.

In accordance with another feature, the gel layer is a mixture of isocyanate and polyurethane.

In accordance with another feature, the isocyanate is 200 to 350 parts by weight relative to 1000 parts by weight of the polyurethane.

In accordance with another feature, the forming the gel layer comprises forming the gel layer to have a thickness of 2 mm to 2 cm.

In accordance with another feature, forming the substrate layer comprising forming the substrate layer as a mixture comprising 32 to 60 parts by weight of isocyanate with 100 parts by weight of polyurethane.

In accordance with another feature, the substrate layer is formed at a molding temperature of 40° C. to 50° C. and a molding pressure of 0.7 mPa.

In accordance with another feature, a pattern mold is laid prior to forming the gel layer to create an anti-slip surface texture on the top side of the top surface layer member.

In accordance with another feature, the gel layer is formed by dispensing a gel material onto the bottom side of the top surface layer member and waiting for a period of one minute before dispensing a substrate material to form the substrate layer.

Although the invention is illustrated and described herein as embodied in a method for forming an anti-fatigue mat, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention. No particular scale is implied by the drawings, rather, certain dimensions may be exaggerated or minimized in the drawings so as to clearly illustrate the various elements and how they interrelate.

DETAILED DESCRIPTION

Figure 1:
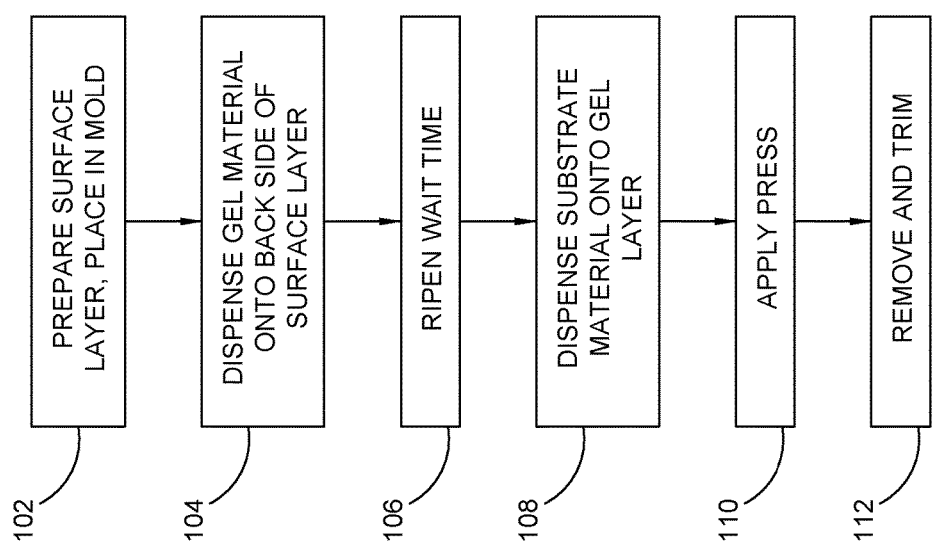
FIG. 1 is a flowchart diagram of method of making an anti-fatigue mat, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient method for creating an anti-fatigue mat using minimal materials that have good bonding properties between the layers of material, as well as good anti-fatigue properties. FIG. 1 is a flowchart diagram of method 100 of making an anti-fatigue mat, in accordance with some embodiments. In general, according to the method 100, an anti-fatigue mat is made by placing a top surface layer member into a mold. The top surface layer member has a top surface, which is the outward-facing surface, and a back surface, which is inward-facing and not exposed to the outside. The top surface layer member is placed upside down in the mold so that the back surface faces upwards. The top surface layer member can be made of fabric, such as woven materials (e.g. cotton), or leather, or similar materials. Since most of wear will be experienced on the top surface layer, it needs to be durable. Once the top surface layer member is in place, it is arranged in the mold to form a cavity into which a gel material, and then a substrate material are dispensed. A press is used to heat and cure the materials. After the press, the assembly is removed and the excess material of the top surface layer member is trimmed to produce the anti-fatigue mat.

In step 102 the top surface layer member is placed over the lower mold. The lower mold includes a flat level mold surface with a contiguous raised portion that forms a closed structure (i.e. like a loop and does not have an end point) on the mold surface. The raised portion can be formed integrally on the surface of the lower mold, or it can be a separate article that is registered into position on the surface of the lower mold. The top surface layer member is a sheet-like article that is laid over the lower mold, and particularly over the raised portion. The top surface layer member is sized such that peripheral portions of the top surface layer member extend outside of the raised portion, creating a bounded area within the raised portion that is lower than a top of the raised portion. Accordingly, liquids introduced into the bounded area will be contained within the bounded area. The back side of the top surface layer member is facing upwards, and is prepared by cleaning and can also be roughened to increase adherence of the gel and substrate materials.

Once the top surface layer member is in place and prepared, an outer or outer frame member is lowered onto the top surface layer member. The outer frame member has an opening through it that is sized and shaped to correspond with the outside of the raised portion (e.g. the first frame member), thus the outer frame member presses against the top surface layer member outside of the raised portion, against the mold surface of the lower mold, to hold the top surface layer member in place during the rest of the method 100.

In step 104 a gel material is dispensed onto the top surface layer member in the portion within the cavity formed by raised portion, such that when the gel material is evenly distributed it has a desired thickness (height). However, the thickness of the resulting gel layer is such that it does not fill the volume or cavity resulting from the raised portion, allowing for substrate material to be added. In step 106 the gel material is allowed to "ripen" or reach a desired state to receive the substrate material. The gel material bonds with the top surface layer member. In step 108 the substrate material is dispensed onto the gel material, and is spread evenly. The amount of substrate material dispensed is enough to fill the volume surrounded by the raised portion of the mold with the top surface layer member in place. In step 110 a press head is placed over the laminate to heat and apply pressure to the laminate, curing the gel and substrate materials. As a result, the top surface layer member becomes bonded to the gel and substrate materials. The press head of the upper mold completely covers the region occupied by the laminate and can slightly protrude into the space, below the height of the raised portion with the top surface layer member, to ensure sufficient pressure is applied. Once the materials are cured, the press head can be lifted, and the laminate removed from the mold, and trimmed in step 112. When complete, the method 100 produces an anti-fatigue mat substantially as shown in FIG. 2.

Figure 2:
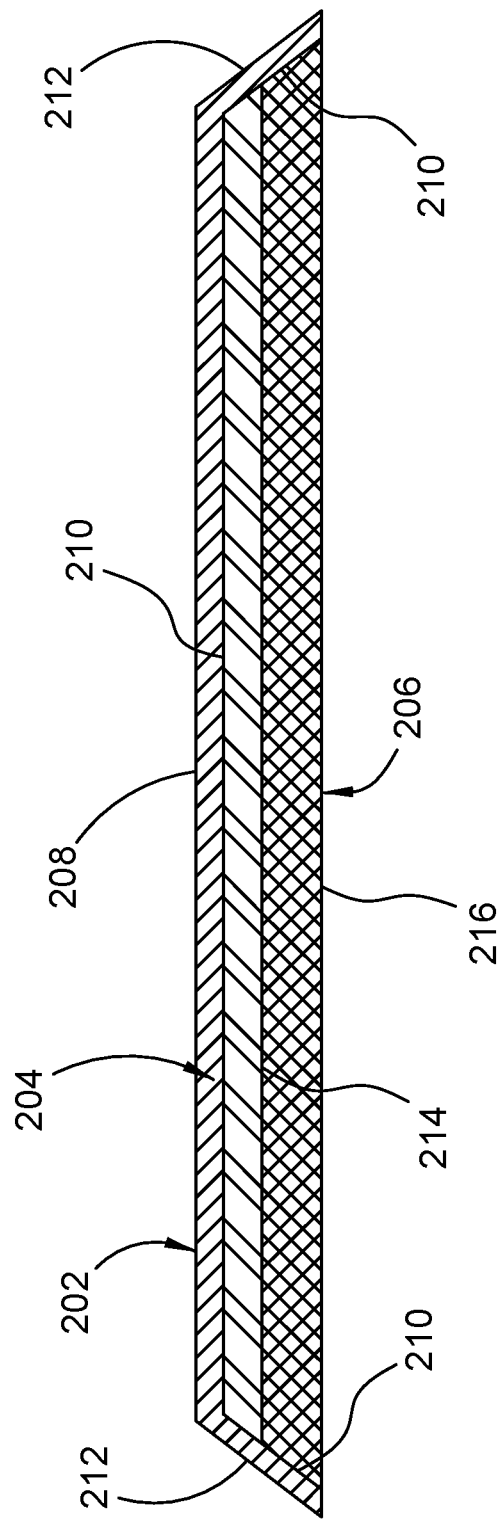
FIG. 2 is a side cut-away view of an anti-fatigue mat, in accordance with some embodiments.

FIG. 2 is a side cut-away view of an anti-fatigue mat 200, in accordance with some embodiments. As shown here, the mat 200 is in the orientation in which it is intended to be used, with the top surface layer member 202 on the top. In use, a user will stand on the top surface 208 of the mat 200. However, when made, using the method 100 of FIG. 1, the mat 200 is made inverted from the orientation shown here, such that the top surface 208 will be lower-most in the mold. In such an orientation, the back side 210 will be facing upward. The mat 200 includes a layer of gel material 204, and a layer of substrate material 206 that meet at boundary 214. The exterior surface 216 of the substrate layer is the surface that is placed on the floor surface when the mat 200 is in use. The sides 212 of the mat 200 are angled inward, from the bottom to the top (in the use orientation shown here) to prevent the mat 200 from tripping users and others. The gel material 204 and the substrate material 206 can each be formed, for example, by mixing isocyanate and polyurethane in different proportions to achieve different resilience.

Figure 3:
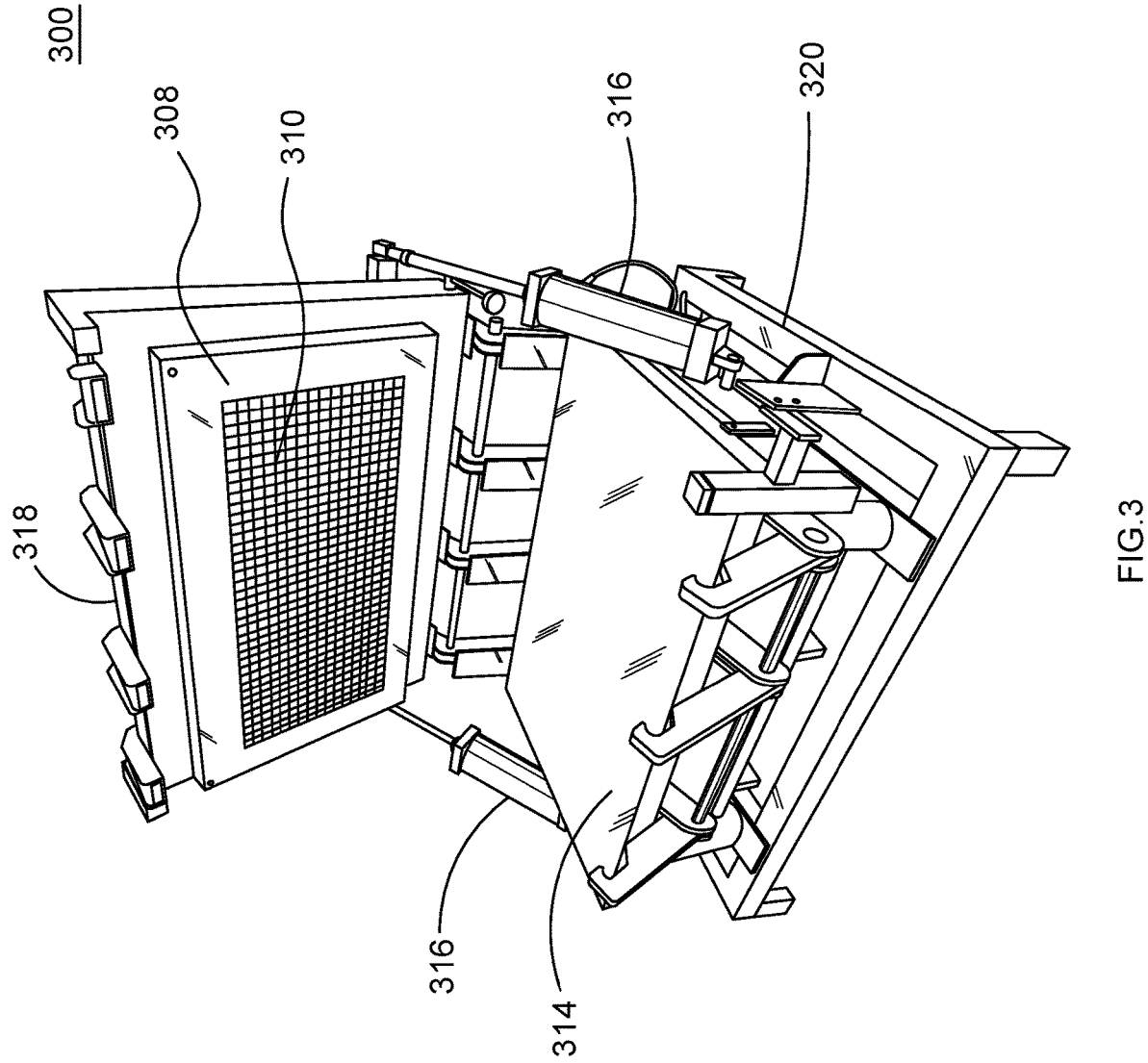
FIG. 3 is a front and side perspective view of a press assembly including a mold for making anti-fatigue mats, in accordance with some embodiments.

FIG. 3 is a front and side perspective view of a press assembly 300 for making anti-fatigue mats, in accordance with some embodiments. The press assembly 300 includes a pedestal surface 314 on which a mold is placed, and a press head 308 mounted on an overhead carrier 318 that is hinged in relation to the pedestal surface 314. The press head 308 includes a press surface 310 that can be patterned to impart a pattern into the bottom of the substrate material 206. A pair of hydraulic actuators 316 can be used to control movement of the overhead carrier 318 and the press head 308. The press assembly includes a stand 320 in which the pedestal is mounted.

Figure 4:
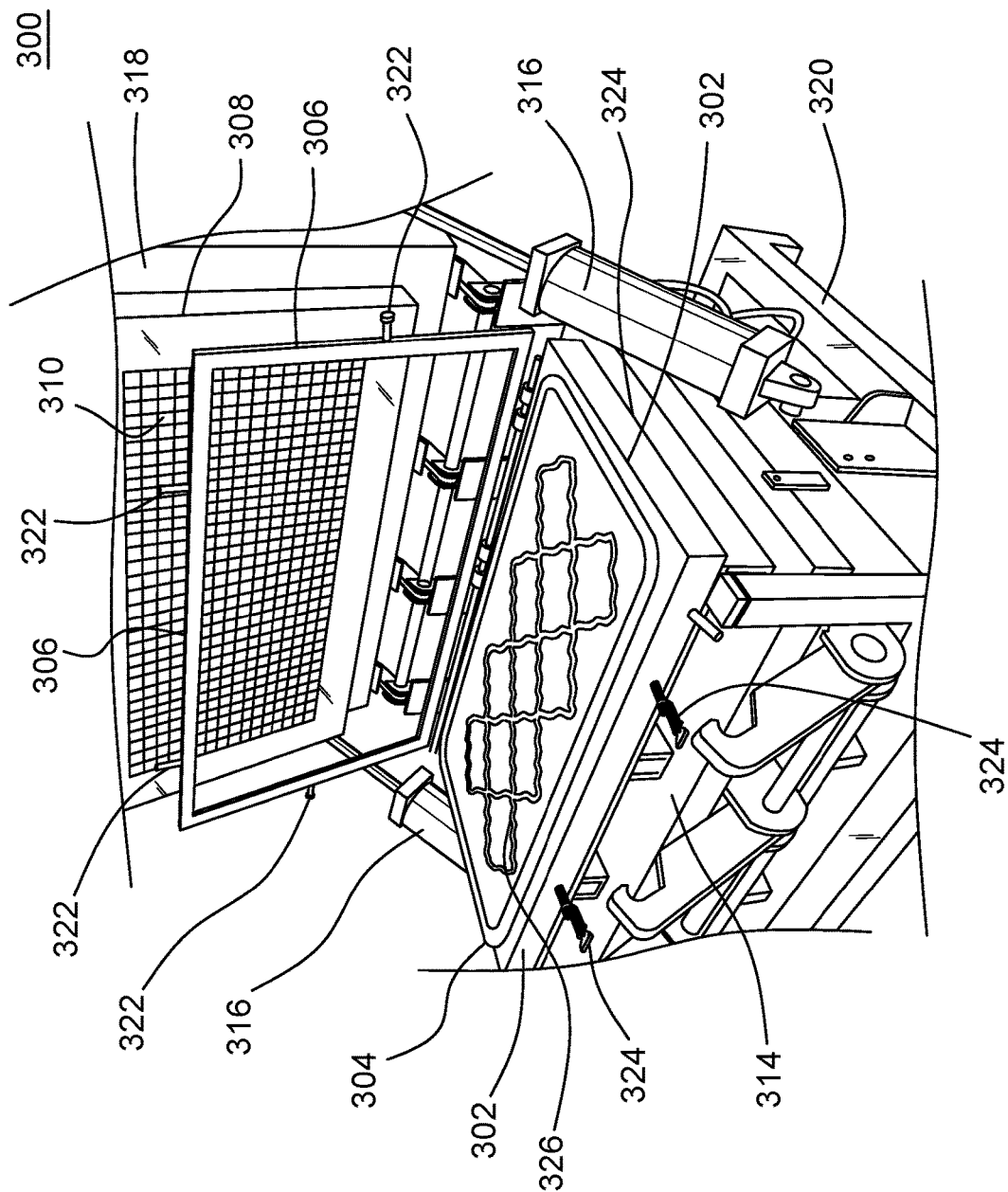
FIG. 4 a front and side perspective view of a press assembly for making anti-fatigue mats, in accordance with some embodiments.
Figure 6:
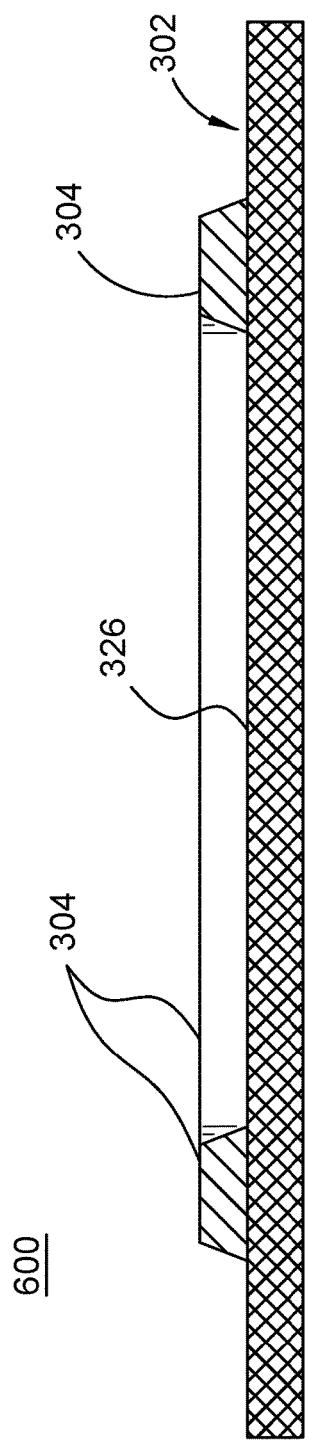
FIG. 6 is a side cut-away view of a mold for use in a press assembly for making an anti-fatigue mat, in accordance with some embodiments.

FIG. 4 a front and side perspective view of the press assembly 300 including a lower mold 302 for making anti-fatigue mats, in accordance with some embodiments. The lower mold 302 is placed on the pedestal surface 314 and fixed in place, and has a side configuration as shown in FIG. 6. The height of the lower mold 302 above the pedestal surface 314 is controlled so as to optimize contact with the press head 308 when the overhead carrier 318 is lowered. The lower mold 302 provides a generally level surface 326 that can be patterned to provide an anti-slip surface texture, and that is surrounded by a ridge or raised portion 304. The raised portion 304 acts as a first frame and defines the outer boundary or perimeter and shape of the anti-fatigue mat being made. The raised portion 304 defines a volume or cavity over and around the surface 326, from side to side, back to front, and from the surface 326 to a height of the raised portion 304. An outer frame member 306 is hinged to the lower mold 302, and has an opening such that the outer frame member 306, when lowered, surrounds the raised portion 304. Thus, in embodiments where the raised portion 304 is rectangular shaped as shown, the opening in the outer frame member 306 is sized and shaped to be slightly larger than the outside of the raised portion 304. The outer frame member can include latch extensions 322 that generally protrude outward from the outer frame member 306 and are engaged by latches 324 which exert downward pressure on the outer frame member 306 and hold it in place during the molding process.

The molding process starts with the press assembly 300 shown as in FIG. 4 with the press head 308 and the outer frame member 306 both raised and the surface 326 of the lower mold 302 raised. A sheet of the top surface layer member 202 is placed over the surface 324. The top surface layer member 202 is sized such that the raised portion 304 is also covered by the top surface layer member 202, and the top surface layer member 202 extends farther outward horizontally in all directions beyond the raised portion 304. The outer frame member 306 is then lowered over the top surface layer member 202, and the top surface layer member 202 is pressed (e.g. manually) into the region bounded by the raised portion 304 to create a depression or cavity. The outer frame member 306 can then be latched in place by having latches 324 engage their corresponding latch extensions 322. This arrangement is shown in FIG. 5.

Figure 5:
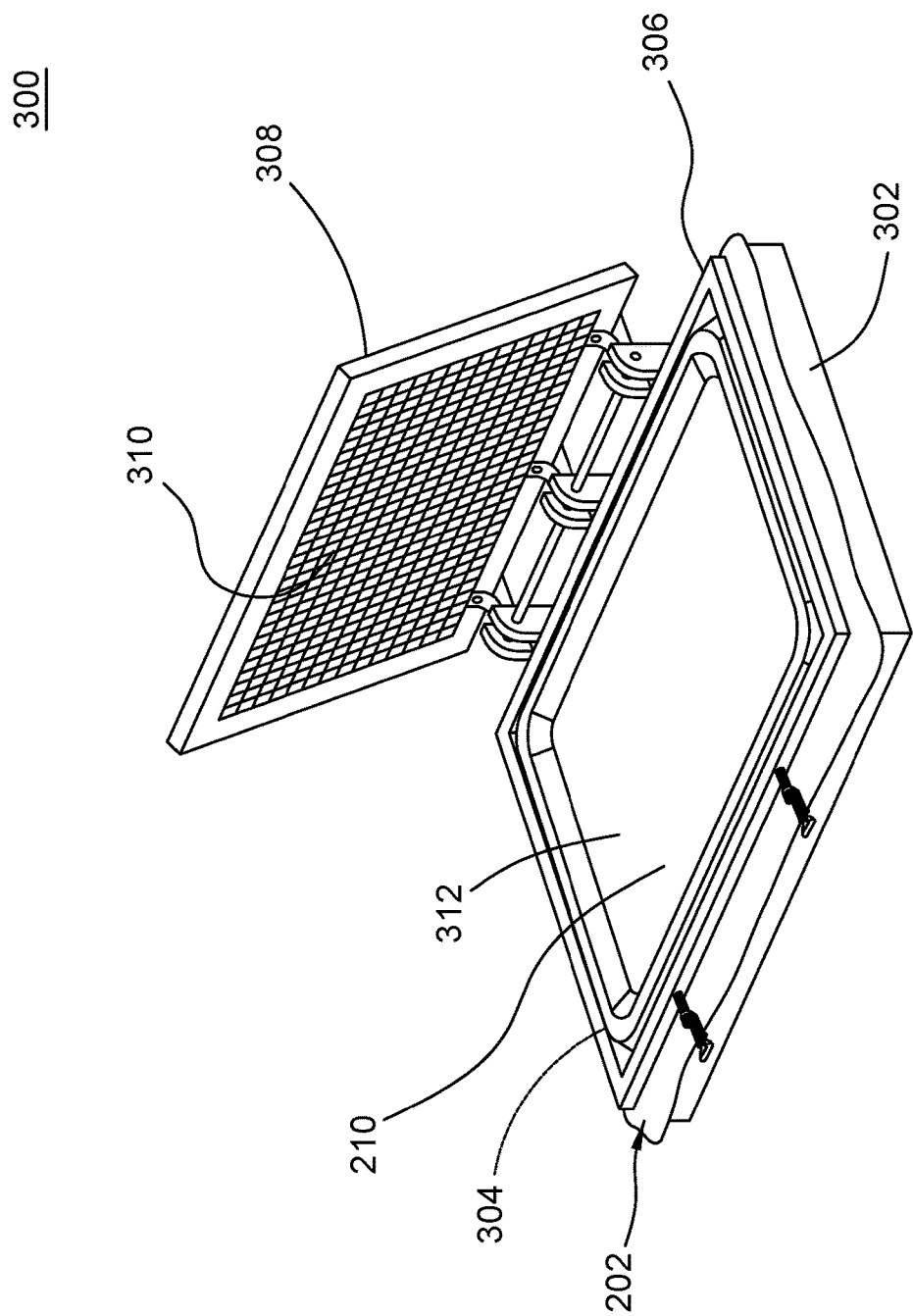
FIG. 5 is a front and side perspective view of a press assembly including a mold loaded with a top surface layer member for an anti-fatigue mat, in accordance with some embodiments.
Figure 7:
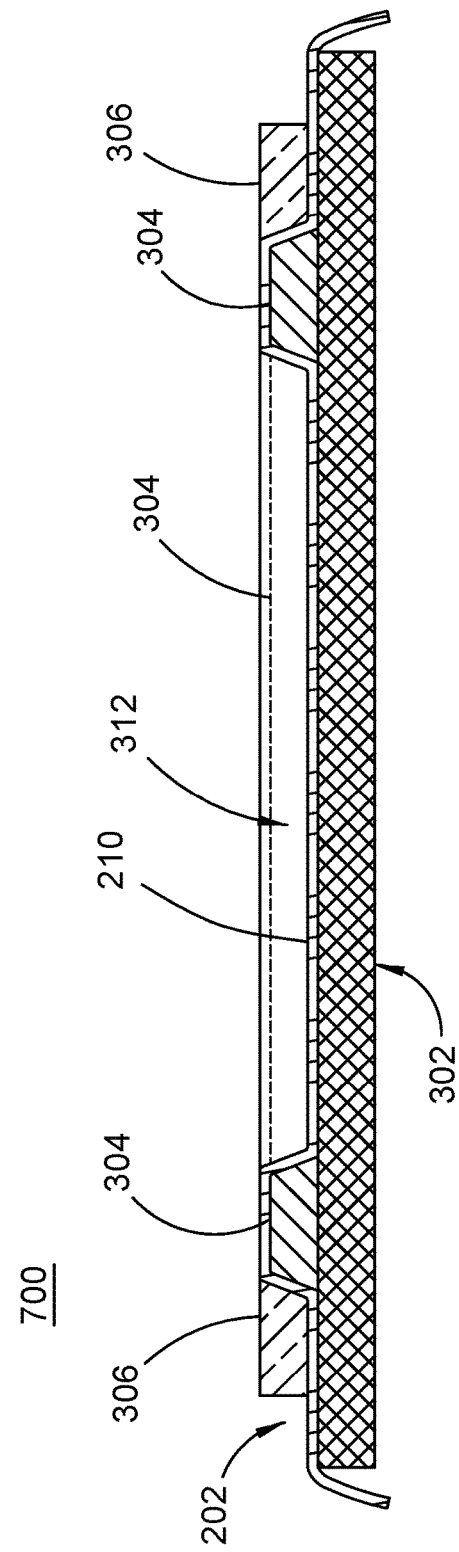
FIG. 7 is a side cut-away view of a mold that is loaded with a top surface layer member, in accordance with some embodiments.

FIG. 5 is a front and side perspective view of a press assembly 300 including a lower mold 302 loaded with a top surface layer member 202 for an anti-fatigue mat, in accordance with some embodiments. The top surface layer member 202 is shown laid over the lower mold 302, covering the raised portion 304 (which is under the top surface layer member 202 here), with the outer frame member 306 lowered and pressing the top surface layer member against the surface of the lower mold 302, as shown in FIG. 7. The top surface member 202 is placed upside down relative to its orientation when used as a mat. That is, the surface facing downward is the surface on which users will stand. The back side 210 faces upward in this part of the process. As seen here, the outer frame member 306 is lowered such that a portion of the top surface layer member 202 is between the bottom of the outer frame member 306 and the top surface of the lower mold 302. Further, the top surface layer member 202 covers the raised portion 304 (also referred to as a first frame member). The top surface layer member 202 is also seated into the mold so that the back side 210 within the region bounded by the raised portion 304 creates a depression or cavity 312.

FIG. 6 is a side cut-away view 600 of a lower mold 302 for use in a press assembly 300 for making an anti-fatigue mat, in accordance with some embodiments. Specifically the lower mold 302 is shown as it would appear before a top surface layer member is loaded into the lower mold 302, as in FIG. 4. The lower mold 302 provides a generally level surface and includes a raised portion 304 that surrounds a region 326, defining a cavity or depression within the region surrounded by the raised portion 304. The walls of the raised portion adjacent to the region 326 can be angled or sloped away from the region 326 as the wall increases with height. This allows the sides of the anti-fatigue mat to have correspondingly angled sides that prevent tripping of users.

FIG. 7 is a side cut-away view 700 of a lower mold 302 that is loaded with a top surface layer member 202, in accordance with some embodiments. As shown here, the view 700 corresponds to the press assembly 300 as shown in FIG. 5. Also, the lower mold 302 as shown in FIG. 6 is the starting state of the lower mold 302. As seen herein view 700, the top surface member 202 is laid over the top surface of the lower mold 302, including the raised portion 304. The outer frame member 306 is lowered and is over the top surface layer member 202, around the raised portion 304. The top surface layer member 202 is also pushed down into the region surrounded by the raised portion 304 to create the cavity 312 or depression that is bounded at its bottom and sides by the back side 210 of the top surface layer member 202.

Figure 8:
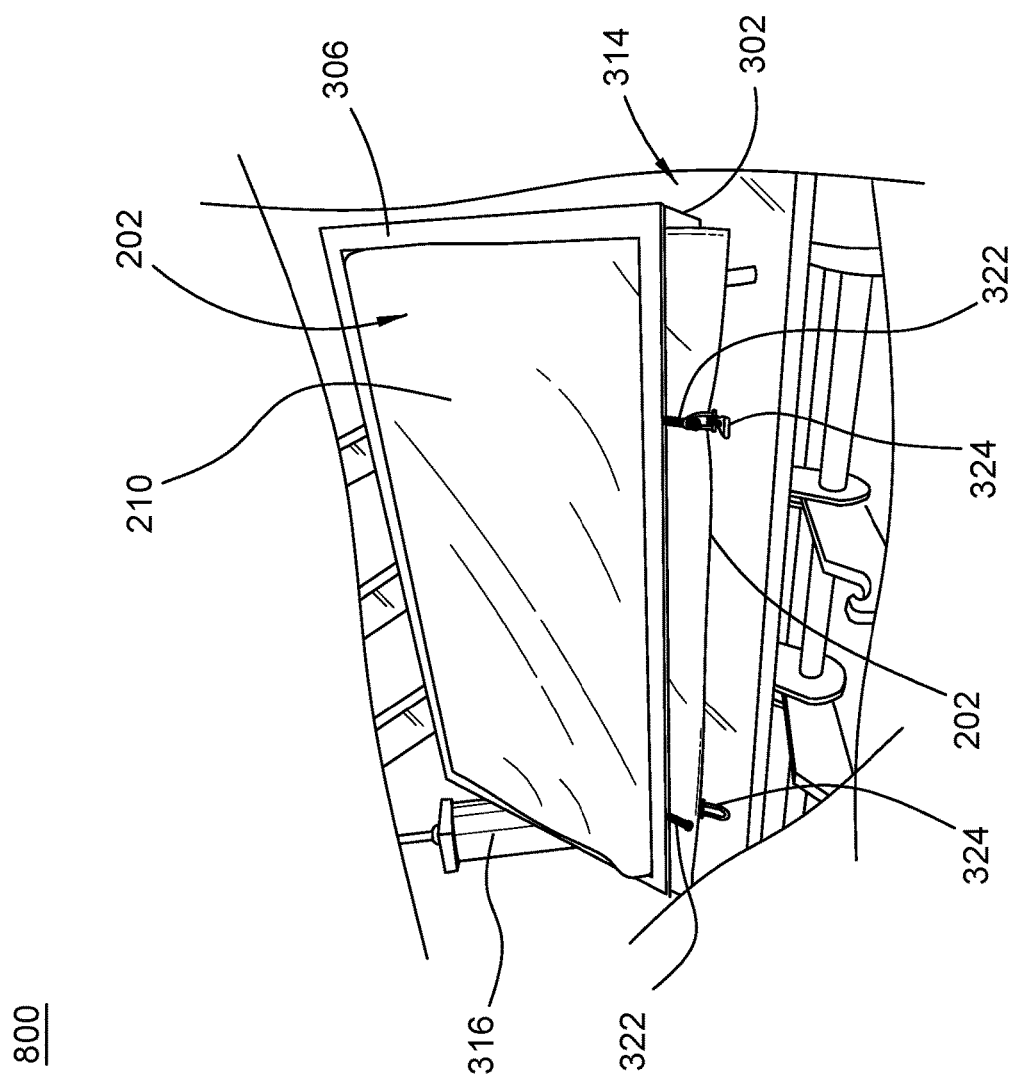
FIG. 8 is a front side perspective view of a mold in a press assembly, with the mold being loaded with a top surface layer member, in accordance with some embodiments.
Figure 9:
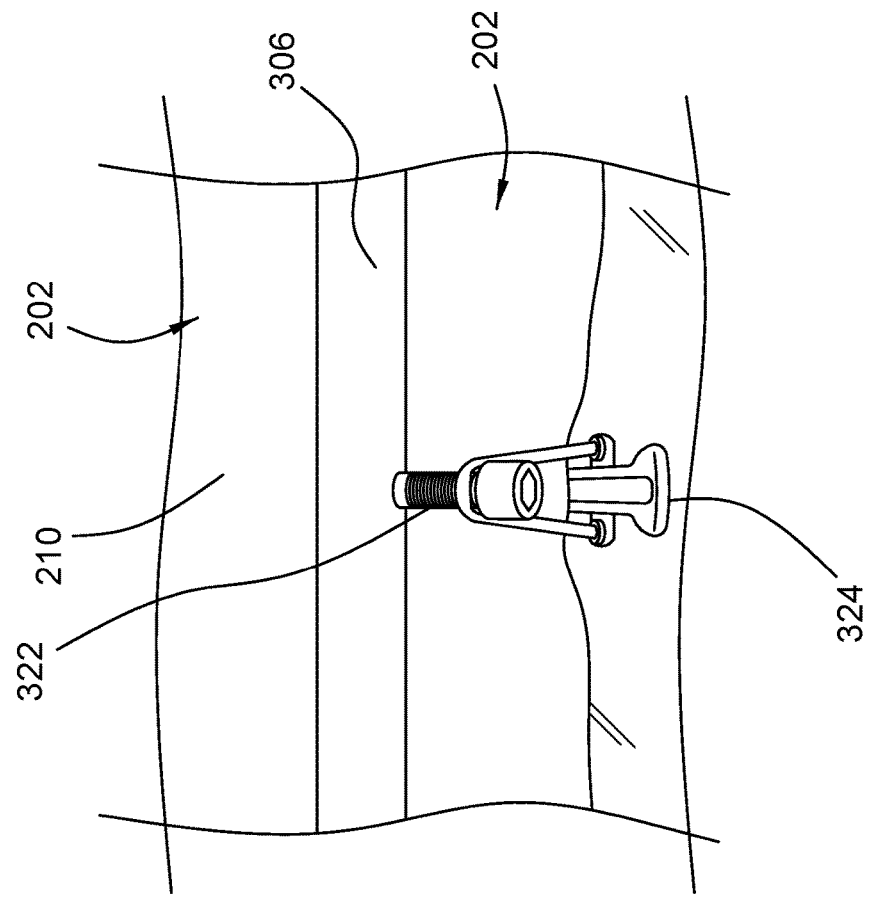
FIG. 9 is a detail view of a mold latch in a mold loaded with a top surface layer member, in accordance with some embodiments.

FIG. 8 is a front side perspective view 800 of a lower mold 302 in a press assembly, with the lower mold 302 being loaded with a top surface layer member 202, in accordance with some embodiments, and as shown in FIGS. 5 and 7. In this view 800, the outer frame member 306 is held in place by the latches 324 engaging the latch extensions 322. FIG. 9 shows a detail view 900 of the mold latch 324 in a lower mold 302 loaded with a top surface layer member 202. The latches 324 are configured to pull down on the several latch extensions 322 on the outer frame member 306, pinching the top surface layer member 202 against the top surface of the lower mold 302.

Figure 10:
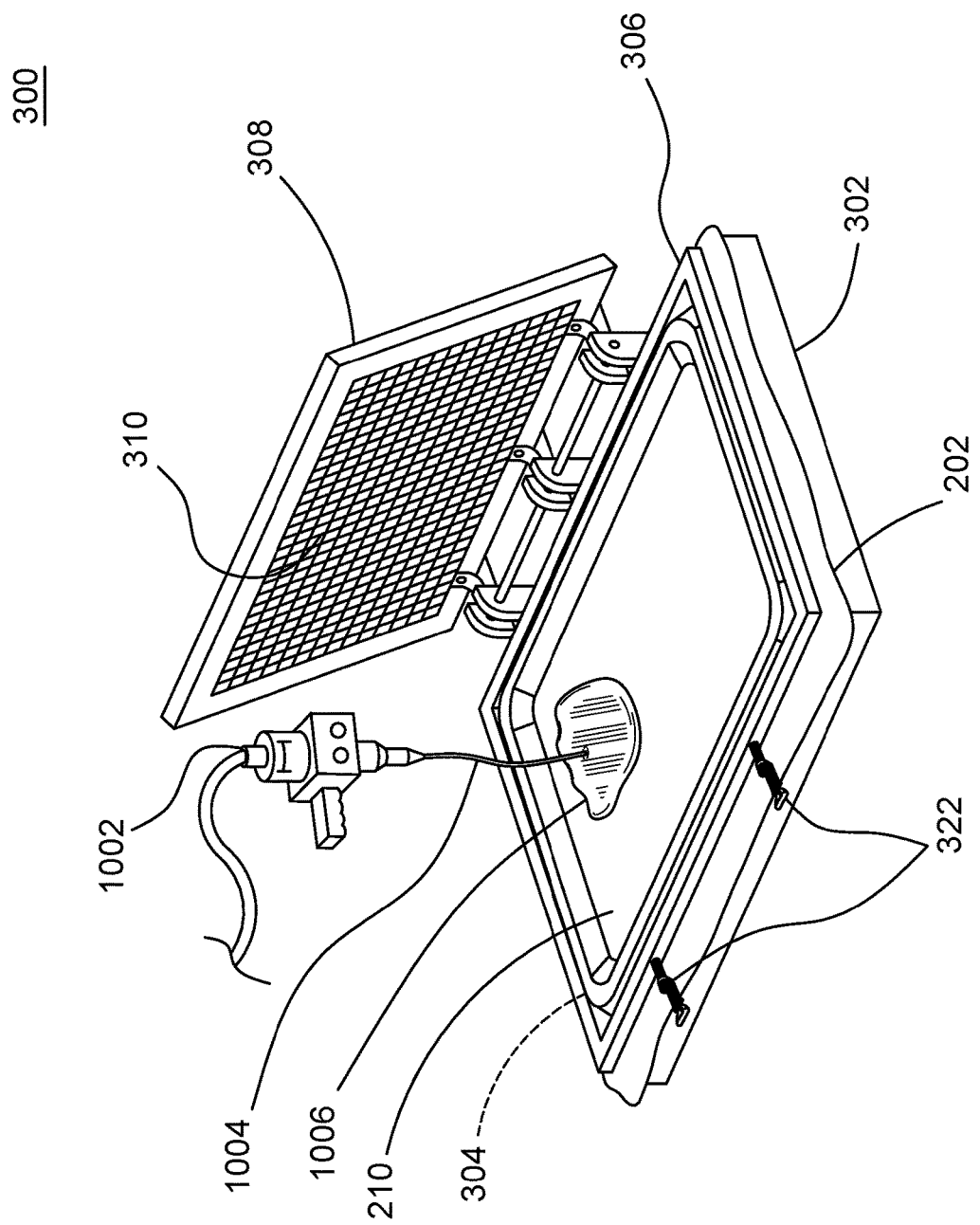
FIG. 10 is a front side perspective view of a mold in which gel is being dispensed onto a top surface layer member, in accordance with some embodiments.
Figure 11:
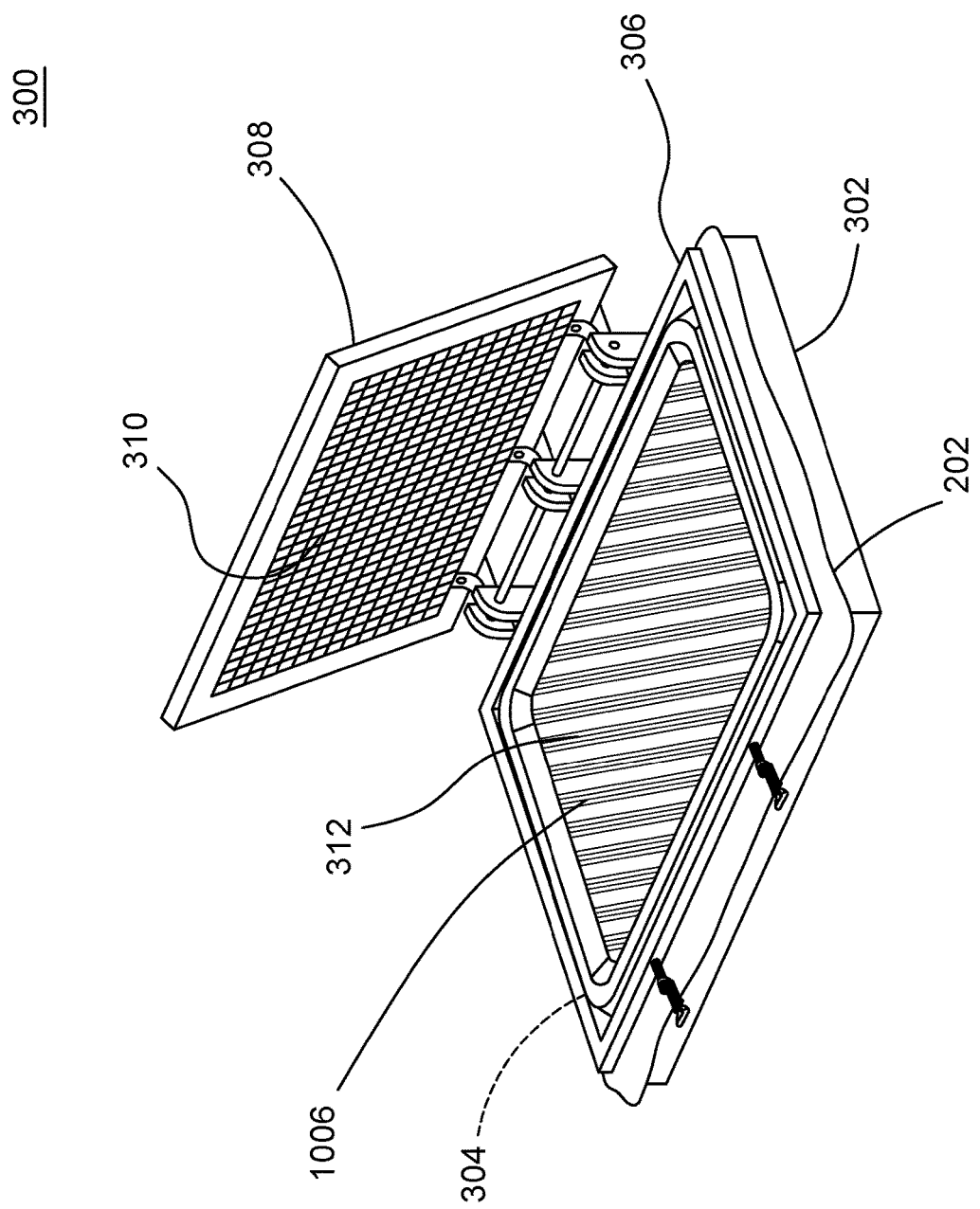
FIG. 11 is a front side perspective view of a mold in which gel has been dispensed into a gel layer on top of a surface layer member, in accordance with some embodiment.
Figure 12:
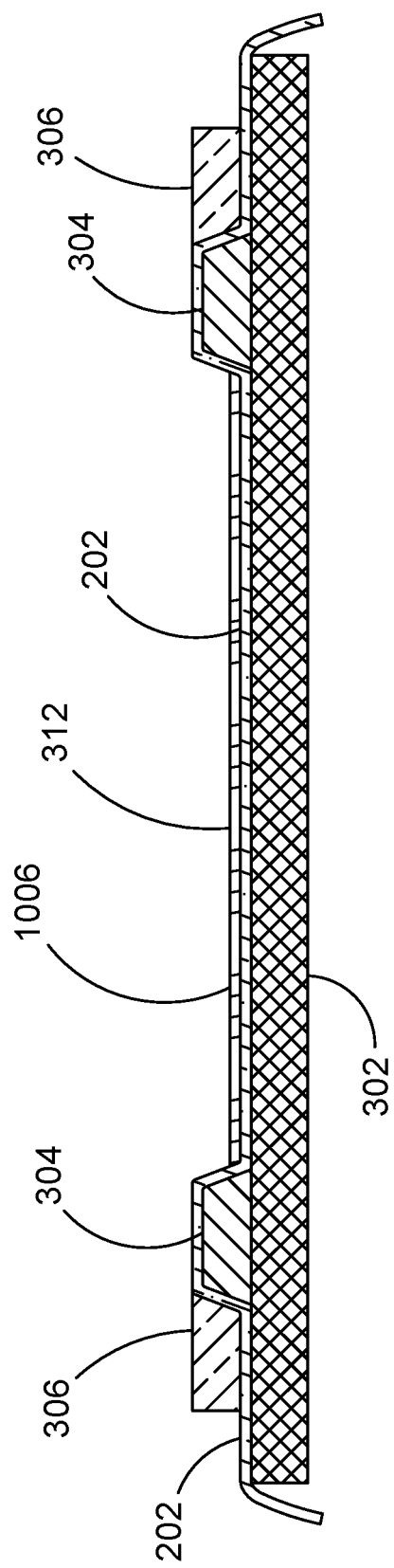
FIG. 12 is a side cut-away view of a mold in which gel has been dispensed into a gel layer on top of a surface layer member, in accordance with some embodiment.

FIG. 10 is a front side perspective view of a mold 300 in which gel material is being dispensed onto a top surface layer member 202, in accordance with some embodiments. In particular, a gel material dispenser 1002 is used to dispense a stream 1004 of gel material onto the back side 210 of the top surface layer member 202 within the depression or cavity formed by the raised portion 304 (hidden under the top surface layer member 202 here). The dispensed gel material 1006 collects in the depression and can be spread evenly using a tool. The amount of gel material dispensed is sufficient to achieve a desired thickness (vertically) of the gel material layer. FIG. 11 shows the press assembly 300 after the dispensed gel material 1006 has been leveled in the depression 312. FIG. 12 shows a side cut-away view of a lower mold 302 in which gel material 1606 has been dispensed and leveled into a gel layer on top of a surface layer member 202. The gel material is allowed time to ripen or partially cure, if not fully cure in some embodiments, at which time the substrate material can be dispensed onto the gel layer.

Figure 13:
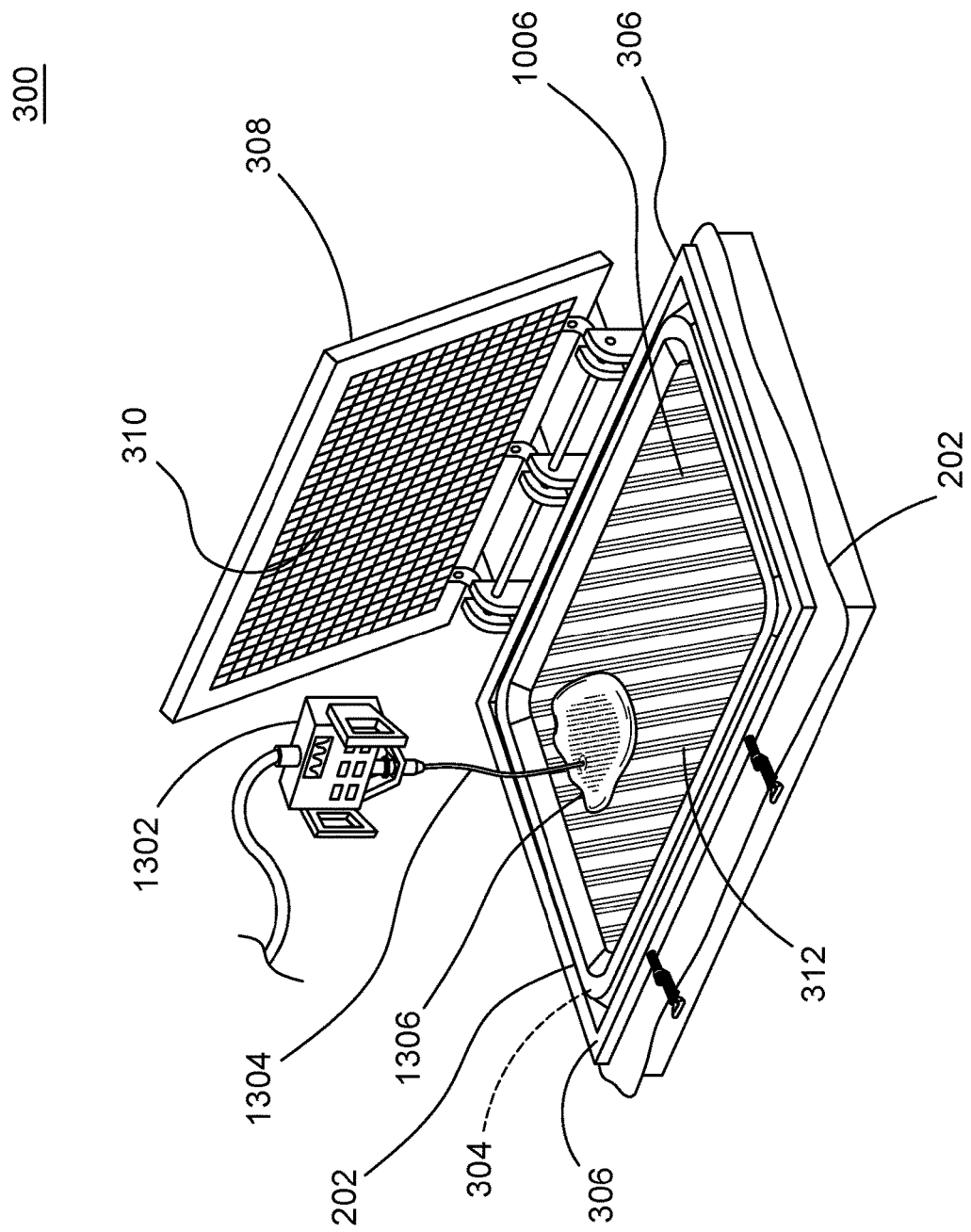
FIG. 13 is a front side perspective view of a mold in which a substrate material is being dispensed onto a gel layer, in accordance with some embodiments.
Figure 14:
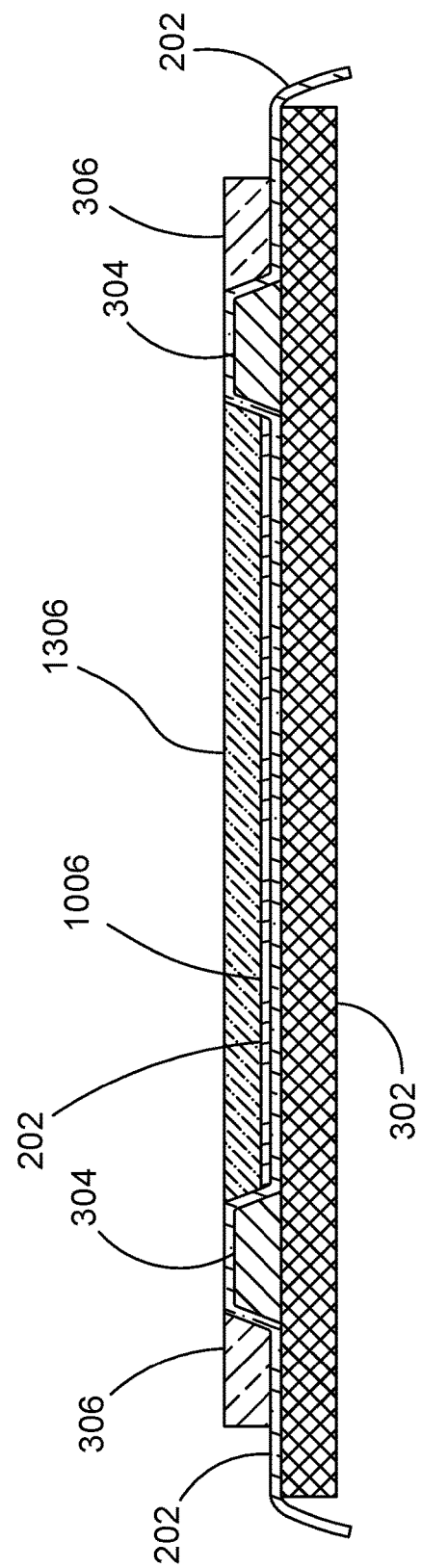
FIG. 14 is a side cut-away view of a mold in which substrate material has been dispensed onto a gel layer that is on a surface layer member, in accordance with some embodiment.
Figure 15:
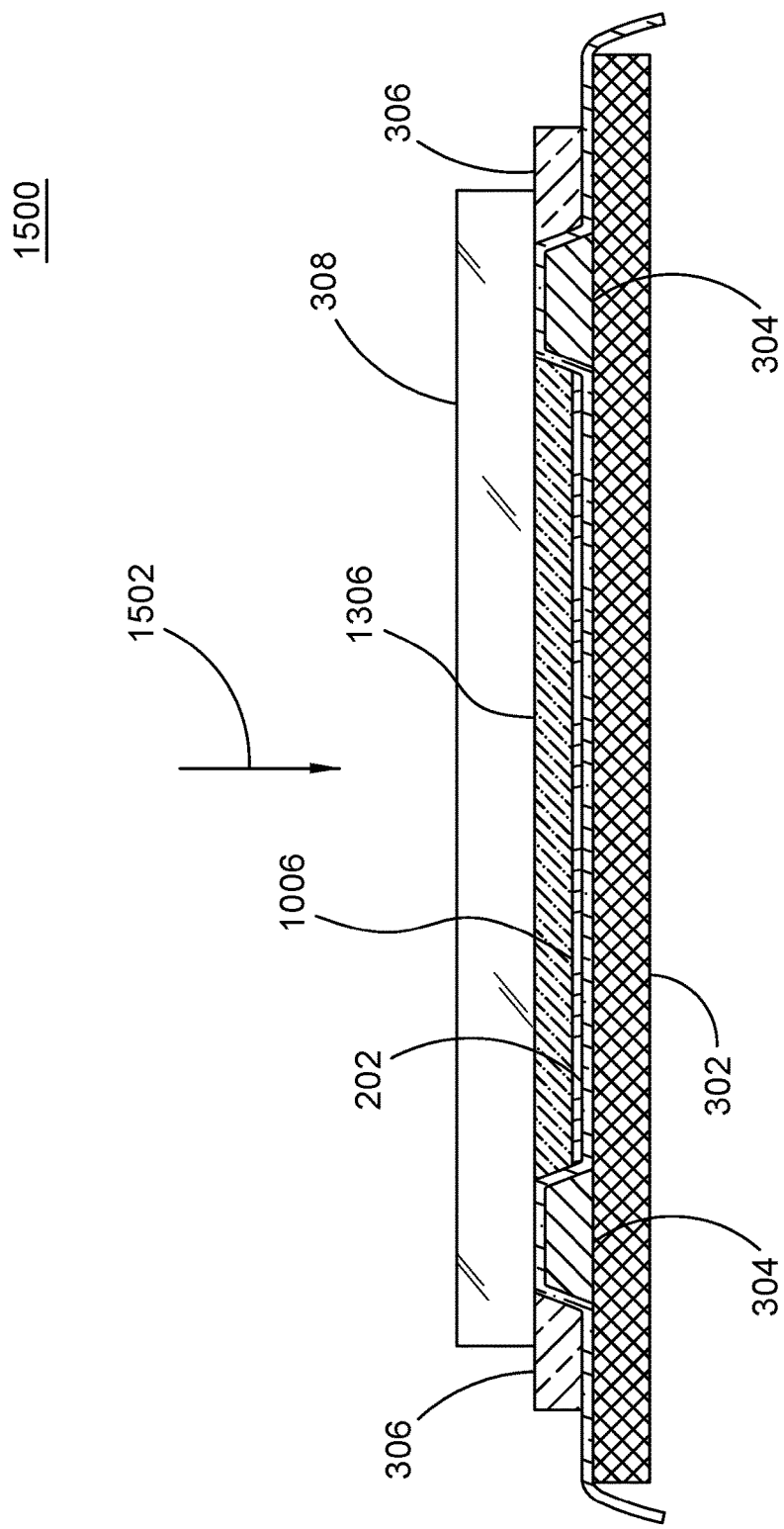
FIG. 15 is a side cut-away view of a mold in which substrate material has been dispensed onto a gel layer that is on a surface layer member, where the layers are being pressed and cured by a press head, in accordance with some embodiment.
Figure 16:
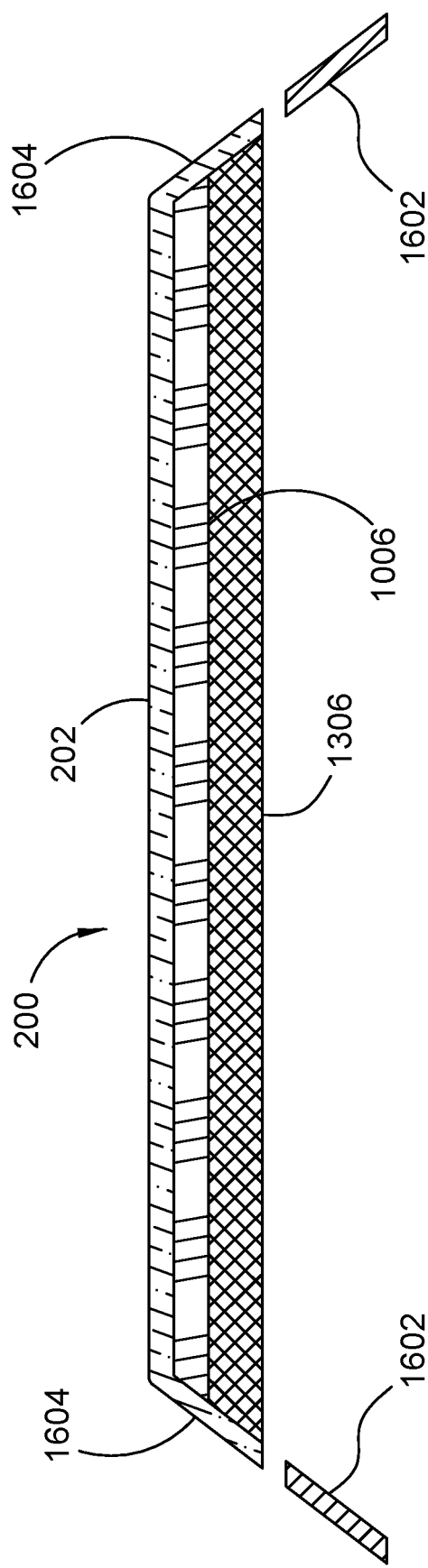
FIG. 16 is a side cut-away view of an anti-fatigue mat being produced by trimming after a press operation, in accordance with some embodiments.

FIG. 13 is a front side perspective view of the lower mold 302 in the press assembly 300 in which a substrate material is being dispensed onto a gel layer 1606, in accordance with some embodiments. A substrate material dispenser 1302 dispenses a stream 1304 of substrate material on the dispensed gel material 1006. The dispensed substrate material 1306 is leveled, and the amount of substrate material dispensed is sufficient to substantially fill the depression 312 to the top of the raised portion 304 with the top surface layer member 202 over the raised portion 304. FIG. 14 shows a side cut-away view 1400 of a lower mold 302 in which dispensed substrate material 1306 has been dispensed onto a gel layer 1006 that is on the top surface layer member 202. As can be seen in FIG. 14, the dispensed substrate material 1306 can fill the depression to the height of the portion of the top surface layer member 202 that passes over the raised portion 304. As shown in FIG. 14, the laminate, which is the cured mat assembly, created by the process thus far is ready for the press head to be applied. FIG. 15 is a side cut-away view 1500 in which the press head 308 has been lowered into contact with the laminate, as indicated by arrow 1502. The press head 308 applies pressure and heat to the laminate, and in particular to the dispensed substrate material, to cure the substrate material, and the gel material, thereby bonding the top surface layer 202, gel material 1006, and substrate material 1306 together. The pattern 310 is then imparted to the outside surface of the substrate material, and the pattern on the surface of the lower mold 302 is imparted to the outside surface of the top surface layer member 202 due to pressure and/or heat. The amount of time, pressure, and temperature used can vary depending on the thickness and composition of the gel material 1006 and substrate material 1306, as will be discussed in the following examples. Finally, as shown in FIG. 16, the press head 308 is removed, the laminate is then trimmed, removing excess portions 1602 of the top surface layer member 202 to form the anti-fatigue mat 200. The sides 1604 of the mat 200 are angled as a result of the angle of the raised portion 304 of the lower mold 302 to reduce the likelihood of a user tripping on side/edge of the mat 200. The degree of the angle can vary, but is preferably at least 45 degrees with respect to the vertical direction, depending on the total height of the mat 200.

In the preceding discussion top surface layer can be a material such as leather, cotton, polyester, or similar materials, as well as combinations of such materials. The gel material 1006 can be a silica gel material having a viscosity of 1100-7000 cps (centipoise), and be composed of a mixture of an isocyanate and a polyurethane. The composition of the gel material can be 200 to 350 parts by weight of isocyanate to 1000 parts by weight of the polyurethane. The viscosity of the silica gel can be adjusted as desired by controlling the amount of the isocyanate. However, if the content of the isocyanate is less than 200 parts by weight, the viscosity of the silica gel is less than 1100 cps, which may result in failure to ensure sufficient bonding strength to the top surface layer member and the substrate material. On the other hand, if the content of the isocyanate is more than 350 parts by weight relative to the polyurethane, although the viscosity of the silica gel will be increased, the hardness of the silica gel after coagulation is also increased, thereby affecting the resilience performance of the mat, reducing the anti-fatigue characteristics.

The thickness of the gel material layer 1006 can be 2 mm to 2 cm and mainly functions as a bonding layer between the top surface layer member 202 and the substrate material 1306. The gel material 1006 will provide decompression and anti-fatigue functions, but for that function the substrate material 1306 is more important and provides most of the compression and anti-fatigue performance. Accordingly, the thickness of the gel material 1006 is preferred to not be greater than 2 cm, and preferably not less than 2 mm thick as this may cause uneven application gel material which can affect the bonding between the top surface layer member 202 and the substrate material 1306.

The substrate material 1306 layer can also be an isocyanate that is mixed with polyurethane, but in proportions in the range of 32 to 60 parts by weight of isocyanate to 100 parts by weight of polyurethane. If the content of the isocyanate is less than 32 parts by weight, the hardness of the polyurethane material will be such that the support offered by substrate material 1306 will be insufficient to provide the desired the anti-fatigue effect. If the content of the isocyanate in the substrate material is more than 60 parts by weight, the substrate material will be too hard and lack elastic property necessary to provide the anti-fatigue effect.

In addition to the steps outlined in regard to FIG. 1, more specific step can include placing the top surface layer member 202 on top of the lower mold 302. The top side (external side) of the top surface layer member faces downward and the back side faces upward in this configuration. The top surface layer member 202 must be properly aligned, and not slanted or at an angle to the mold. The gel material is then dispensed on top of the back side of the top surface layer member in a uniform layer, and can be left to "ripen" for about 1 minute to form the gel material layer. A release agent can be sprayed onto the surface of the press head (upper mold), and the substrate material can be dispenses on top of the gel material layer. The press head can be lowered to close the mold for 3-8 minutes at a molding temperature in the range of 40° C. to 50° C. and a molding pressure of about 0.7 mPa to produce a mat laminate that is then finished into an anti-fatigue mat by trimming off the extra material. In some embodiments, prior to dispensing the gel material, a pattern mold member can be placed into the mold to form a texture on the top surface layer member to increase the anti-slip performance of the mat.

In further refinement of the above general discussion of the method, the following are examples used to create anti-fatigue mats using the general method steps and apparatus described above. In the subsequent examples, the "lower mold" refers to the lower mold 302, and the "upper mold" refers to the press head 308. Together, these mold components mold the mat materials with pressure and heat.

Example 1

The mold temperature was set at 45° C. and the gas pressure was 0.7 mPa. for the mold. A leather top surface layer member was placed on the lower mold of the mold. In this configuration the top side faces downward and the bottom side faces upward. When the leather is placed, the leather is positioned to ensure that the leather is not slanted. A silica gel material was then dispensed on the bottom side of the leather. The silica gel material in this example is a mixture of 200 parts by weight of isocyanate and 1000 parts by weight of polyurethane, and the silica gel material is uniformly distributed on the bottom side, and allowed to ripen for 1 minute to form a silica gel layer. The thickness of the silica gel layer is 1 cm. A release agent was sprayed on the surface of the upper mold (e.g. 310). A substrate material was then dispensed on top of the gel material layer that consisted of 40 parts by weight of isocyanate and 100 parts by weight of polyurethane. Then the mold was closed for 5 minutes. The produced floor mat is subjected to a trimming process.

Example 2

The mold temperature was set at 45° C. and the gas pressure was 0.7 mPa. The leather is placed as a surface layer on the lower mold. A gel material is dispensed onto the back side of the leather that is a mixture of 220 parts by weight of isocyanate and 1000 parts by weight of polyurethane, and the gel material is uniformly distributed on the leather, and allowed to ripen for 1 minute to form a gel layer having a thickness of 1 cm. A release agent is spread on the upper mold. A substrate material of 40 parts by weight of isocyanate and 100 parts by weight of polyurethane is then dispensed on the gel layer in the middle of the mold. The mold is then closed for 5 minutes, whereupon the laminate is removed and trimming process.

Example 3

The mold temperature was set at 45° C. and the gas pressure was 0.7 mPa. with a leather top surface layer member used as in the previous examples. In this example the gel material is a mixture of 240 parts by weight of isocyanate and 1000 parts by weight of polyurethane, and the gel material is uniformly distributed on the bottom side to a thickness of 1 cm and allowed to ripen for one minute. A substrate material mixture of 40 parts by weight of isocyanate and 100 parts by weight of polyurethane was dispensed onto the gel material layer. The mold was closed (after being sprayed with release agent) and closed for 5 minutes, and the resulting laminate was then trimmed.

Example 4

The mold temperature and pressure, and use of a leather top surface layer member is as in prior examples. The gel material is a mixture of 260 parts by weight of isocyanate and 1000 parts by weight of polyurethane, dispensed to a thickness of 1 cm and allowed to ripen for 1 minute. The substrate material is 40 parts by weight of isocyanate and 100 parts by weight of polyurethane. All other operations and process were as in prior examples.

Example 5

The mold temperature and pressure, and use of a leather top surface layer member is as in prior examples. The gel material is a mixture of 280 parts by weight of isocyanate and 1000 parts by weight of polyurethane, dispensed to a thickness of 1 cm and allowed to ripen for 1 minute. The substrate material is 40 parts by weight of isocyanate and 100 parts by weight of polyurethane. All other operations and process were as in prior examples.

Example 6

The mold temperature and pressure, and use of a leather top surface layer member is as in prior examples. The gel material is a mixture of 300 parts by weight of isocyanate and 1000 parts by weight of polyurethane, dispensed to a thickness of 1 cm and allowed to ripen for 1 minute. The substrate material is 40 parts by weight of isocyanate and 100 parts by weight of polyurethane. All other operations and process were as in prior examples.

Example 7

The mold temperature and pressure, and use of a leather top surface layer member is as in prior examples. The gel material is a mixture of 320 parts by weight of isocyanate and 1000 parts by weight of polyurethane, dispensed to a thickness of 1 cm and allowed to ripen for 1 minute. The substrate material is 40 parts by weight of isocyanate and 100 parts by weight of polyurethane. All other operations and process were as in prior examples.

Example 8

The mold temperature and pressure, and use of a leather top surface layer member is as in prior examples. The gel material is a mixture of 350 parts by weight of isocyanate and 1000 parts by weight of polyurethane, dispensed to a thickness of 1 cm and allowed to ripen for 1 minute. The substrate material is 40 parts by weight of isocyanate and 100 parts by weight of polyurethane. All other operations and process were as in prior examples.

Example 9

The mold temperature and pressure, and use of a leather top surface layer member is as in prior examples. The gel material is a mixture of 150 parts by weight of isocyanate and 1000 parts by weight of polyurethane, dispensed to a thickness of 1 cm and allowed to ripen for 1 minute. The substrate material is 40 parts by weight of isocyanate and 100 parts by weight of polyurethane. All other operations and process were as in prior examples.

Example 10

The mold temperature and pressure, and use of a leather top surface layer member is as in prior examples. The gel material is a mixture of 280 parts by weight of isocyanate and 1000 parts by weight of polyurethane, dispensed to a thickness of 1 cm and allowed to ripen for 1 minute. The substrate material is 40 parts by weight of isocyanate and 100 parts by weight of polyurethane. All other operations and process were as in prior examples.

The comparison of the examples is summarized in Table 1 below, along with the resulting viscosity and hardness of the gel layer after the mold process.

TABLE 1

| | Component of Gel | | Viscosity of Gel | Hardness of Gel |
|---|---|---|---|---|
| | Isocyanate | Polyurethane | (cps) | (Shore A) |
| Example 1 | 200 | 1000 | 1100 | 10 |
| Example 2 | 220 | 1000 | 1800 | 11 |
| Example 3 | 240 | 1000 | 2800 | 13 |
| Example 4 | 260 | 1000 | 3600 | 18 |
| Example 5 | 280 | 1000 | 4100 | 20 |
| Example 6 | 300 | 1000 | 5000 | 22 |
| Example 7 | 320 | 1000 | 6300 | 23 |
| Example 8 | 350 | 1000 | 7000 | 25 |
| Example 9 | 150 | 1000 | 1000 | 8 |
| Example 10 | 450 | 1000 | 8200 | 30 |

As shown in Table 1, in the range of 200-350 parts by weight of the isocyanate, the viscosity and hardness of the gel layer increases as the content of the isocyanate increases. For some embodiments the gel mixture can be 240 parts by weight to 100 parts by weight polyurethane.

A method for forming an anti-fatigue mat has been disclosed that minimizes the and simplifies the steps used to create the mat, while ensuring bonding between the external, durable surface layer, and the compliant substrate layer that provides the anti-fatigue effect, and is also the floor-facing layer. A gel material is used to form a gel layer that bonds the top surface layer member to the substrate material layer. The gel layer constituent materials are controlled to achieve a desired viscosity, and the substrate layer constituent materials are controlled to achieve a desired hardness.

What is claimed is:
1. A method of forming an anti-fatigue mat, comprising:
   providing a lower mold that includes:
      a mold surface;

a raised portion on the mold surface that is configured to define a perimeter of the anti-fatigue floor mat, the raised portion forming a cavity within an area surrounded by the raised portion;

an outer frame member having an opening therethrough that is sized to fit around the raised portion of the mold surface;

providing an upper mold that includes a press head having a surface that is sized and shaped to cover the raised portion and the outer frame member;

placing a top surface layer member of the anti-fatigue mat over the raised portion, with an external side of the top surface layer member facing down, and pressing the top surface layer member into the cavity;

placing the outer frame member over the raised portion and the top surface layer member such that the top surface layer member is between the outer frame member and the mold surface;

after placing the outer frame member over the raised portion and the top surface layer member dispensing a gel material on the top surface layer member in the cavity sufficient to cover a portion of the top surface layer member in the cavity completely to a thickness of two millimeters to two centimeters;

dispensing a substrate material onto the gel material, wherein an amount of the substrate material is sufficient to cover the gel material completely within the cavity;

after dispensing the substrate material onto the gel material closing the press head onto the lower mold, while the press head is heated, to cure the gel material and the substrate material and thereby create a cured mat assembly; and opening the press head and then removing the outer frame member, and removing the cured mat assembly from the mold surface and trimming excess material of the cured mat assembly to produce the anti-fatigue mat.

2. The method of claim 1, wherein dispensing the gel material comprises dispensing the gel material having a viscosity of 7000 to 11000 centipoise when cured.

3. The method of claim 1, wherein dispensing the gel material comprises dispensing the gel material that is a mixture having 200-300 parts by weight of isocyanate, and 1000 parts by weight of polyurethane.

4. The method of claim 3, wherein dispensing the gel material comprises dispensing the gel material that is a mixture having 240 parts by weight of isocyanate, and 1000 parts by weight of polyurethane.

5. The method of claim 1, wherein dispensing the substrate material comprises dispensing the substrate material as a mixture of 32 to 60 parts by weight of isocyanate to 100 parts by weight of polyurethane.

6. The method of claim 5, wherein dispensing the substrate material comprises dispensing the substrate material as a mixture of 40 parts by weight of isocyanate to 100 parts by weight of polyurethane.

7. The method of claim 1, wherein closing the press head onto the lower mold comprises applying a pressure of about 0.7 mPa and a temperature of 45 degrees Celsius.

8. The method of claim 7, wherein closing the press head comprises closing the press head for a period of at least 5 minutes before opening the press head.

9. A method for producing a mat comprising:

preparing a top surface layer member having a top side and bottom side, the bottom side facing upward in a lower mold;

dispensing a stream of gel material on the bottom side of the top surface layer member to form a gel layer, the gel layer having a viscosity of 1100-7000 cps;

dispensing a stream of substrate material onto the gel layer to form a substrate layer on the gel layer; and after dispensing the substrate material, applying an upper mold over the lower mold which applies pressure and heat to the substrate layer and gel layer, thereby fully curing the gel material and the substrate material and thereby causing the gel layer to bond with the top surface layer member and the substrate layer to bond with the gel layer.

10. The method according to claim 9, wherein the top surface layer member is a fabric.

11. The method according to claim 10, wherein the fabric is one of leather, cotton, or polyester.

12. The method according to claim 9, wherein the gel layer is a mixture of isocyanate and polyurethane.

13. The method according to claim 12, wherein the isocyanate is 200 to 350 parts by weight relative to 1000 parts by weight of the polyurethane.

14. The method according to claim 9, wherein the forming the gel layer comprises forming the gel layer to have a thickness of 2 mm to 2 cm.

15. The method according to claim 9, wherein forming the substrate layer comprising forming the substrate layer as a mixture comprising 32 to 60 parts by weight of isocyanate with 100 parts by weight of polyurethane.

16. The method according to claim 15, wherein the substrate layer is formed at a molding temperature of 40° C. to 50° C. and a molding pressure of 0.7 mPa.

17. The method according to claim 9, wherein a pattern mold is laid prior to forming the gel layer to create an anti-slip surface texture on the top side of the top surface layer member.

18. The method according to claim 9, wherein the gel layer is formed by dispensing a gel material onto the bottom side of the top surface layer member and waiting for a period of one minute before dispensing a substrate material to form the substrate layer.

19. The method according to claim 9, wherein both the gel material and the substrate material are each a mixture of isocyanate and polyurethane, and wherein the gel material and substrate material have different proportions of the isocyanate and polyurethane.

20. The method according to claim 9, further comprising, after dispensing the gel material, waiting for a predetermined time period before dispensing the substrate material.

* * * * *